(12) United States Patent
Lundman

(10) Patent No.: US 6,446,669 B1
(45) Date of Patent: Sep. 10, 2002

(54) PIPE SEALING APPARATUS

(76) Inventor: Philip L. Lundman, 3631 Fredonia Kohler Dr., Fredonia, WI (US) 53021

( * ) Notice: Subject to any disclaimer, the term of this patent is extended or adjusted under 35 U.S.C. 154(b) by 0 days.

(21) Appl. No.: 09/754,824

(22) Filed: Jan. 4, 2001

(51) Int. Cl.[7] ............................................. F16L 55/10
(52) U.S. Cl. ........................................ 138/91; 138/93
(58) Field of Search ................................. 138/91, 93

(56) References Cited

U.S. PATENT DOCUMENTS

| | | |
|---|---|---|
| 1,690,995 A | 11/1928 | Pratt |
| 2,299,116 A * | 10/1942 | Svirsky ....................... 138/90 |
| 2,678,666 A | 5/1954 | Theis et al. |
| 3,182,725 A * | 5/1965 | Moore .......................... 175/50 |
| 3,431,946 A | 3/1969 | Sawyer |
| 3,714,951 A | 2/1973 | Lundman |
| 3,902,528 A * | 9/1975 | Tartabini et al. .............. 138/93 |
| 3,958,607 A * | 5/1976 | Gray ............................. 138/93 |
| 4,079,755 A | 3/1978 | Van der Lans |
| 4,291,727 A | 9/1981 | Yie et al. |
| 4,354,515 A | 10/1982 | Sutherland |
| 4,413,653 A | 11/1983 | Carter, Jr. |
| 4,429,720 A * | 2/1984 | Beck et al. ................... 138/93 |
| 4,449,584 A * | 5/1984 | Christensen ................. 138/93 |
| 4,467,835 A | 8/1984 | Champleboux |
| 4,467,836 A | 8/1984 | Ragout |
| 4,565,222 A | 1/1986 | Lundman |
| 4,614,206 A | 9/1986 | Mathison et al. |
| 4,890,483 A * | 1/1990 | Vetter ........................... 138/93 |
| 4,895,185 A | 1/1990 | Champleboux et al. |
| 5,353,842 A | 10/1994 | Lundman |
| 5,372,162 A * | 12/1994 | Frey .............................. 138/93 |
| 5,901,752 A | 5/1999 | Lundman |

* cited by examiner

Primary Examiner—James Hook
(74) Attorney, Agent, or Firm—Michael Best & Friedrich LLP

(57) ABSTRACT

A pipe sealing apparatus insertable inside a pipe and inflatable therein to prevent fluid flow and backflow through a defined section of pipe. The pipe sealing apparatus has a first inflatable plug at a first end and a second inflatable plug at a second end connected by an elongated flexible tensile member and a fluid pressure hose. Each inflatable plug has a plurality of ports that may be connected to a source of fluid pressure, plugged, or left unplugged depending on the application. The second inflatable plug may be inflated either simultaneous with the first plug, or independent of the first plug. Each inflatable plug also has a flow-through conduit.

17 Claims, 4 Drawing Sheets

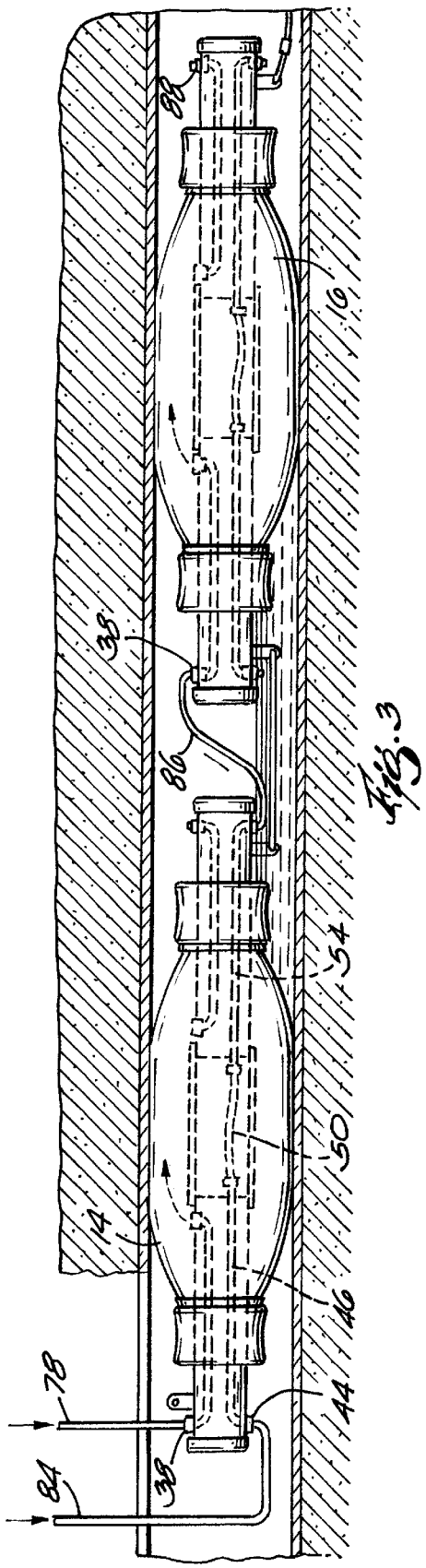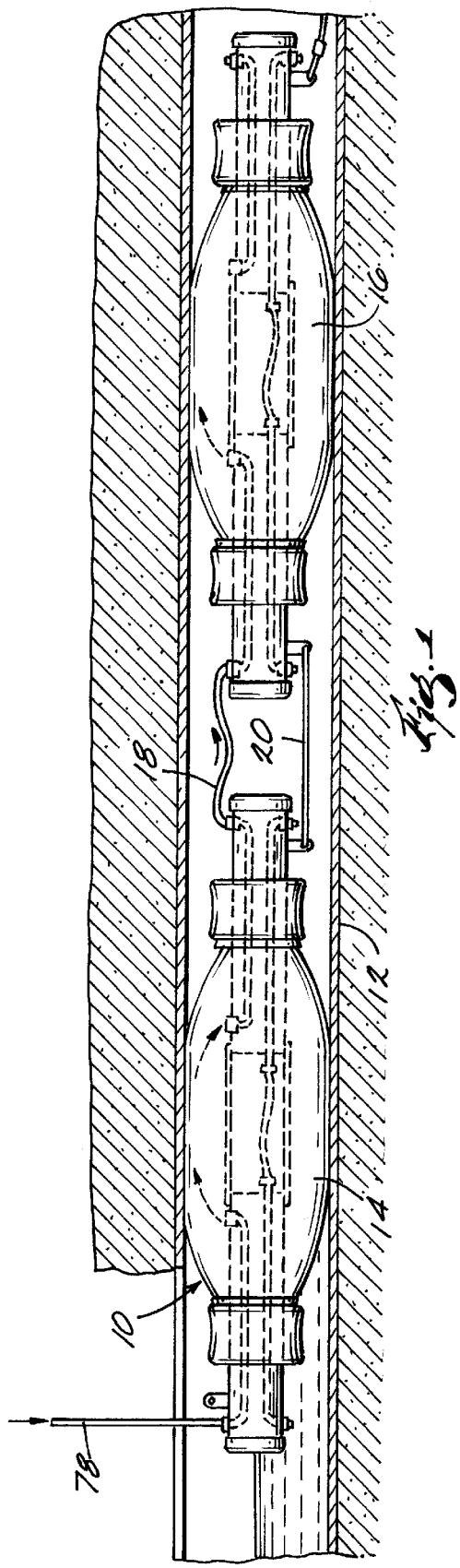

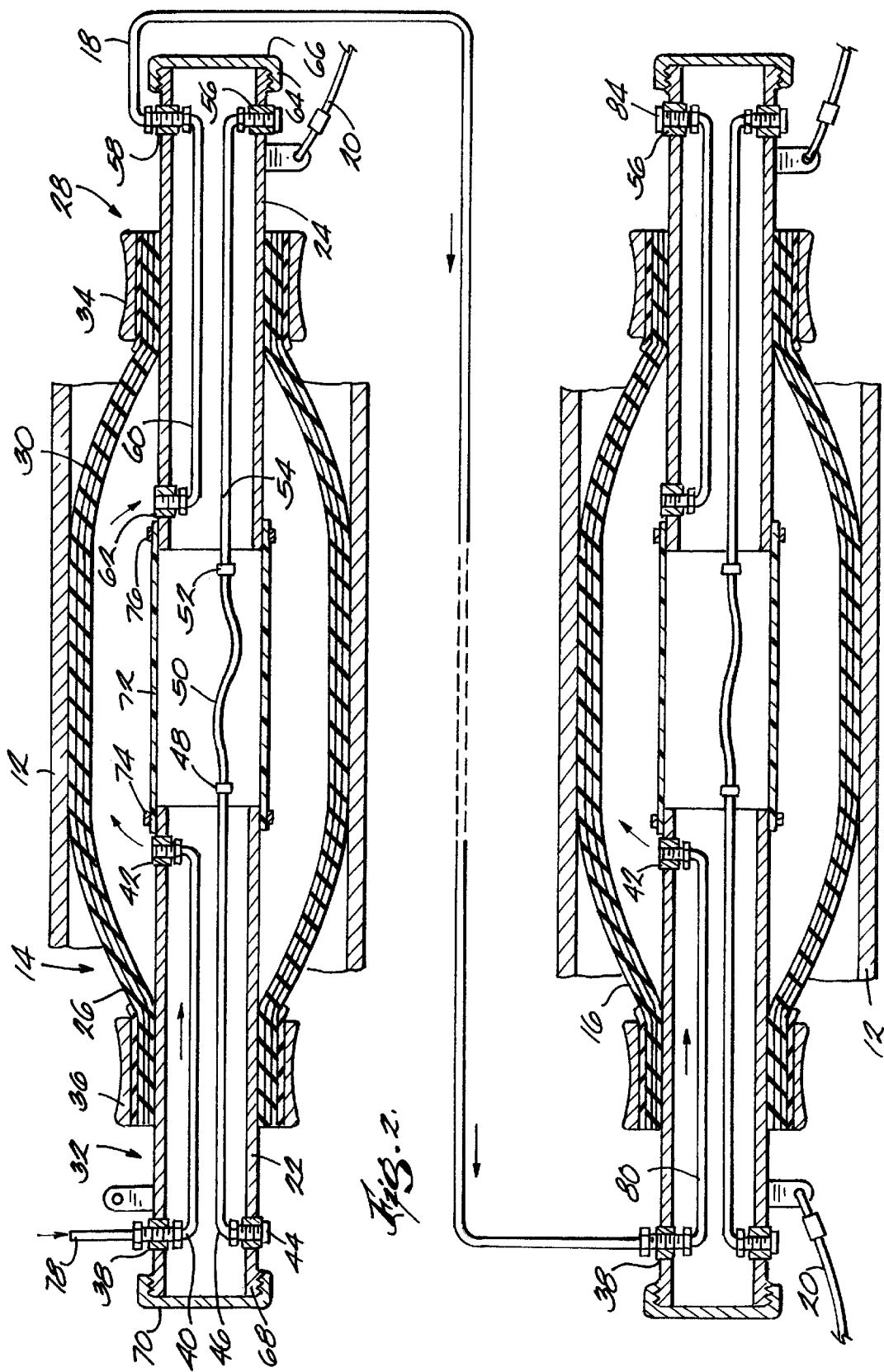

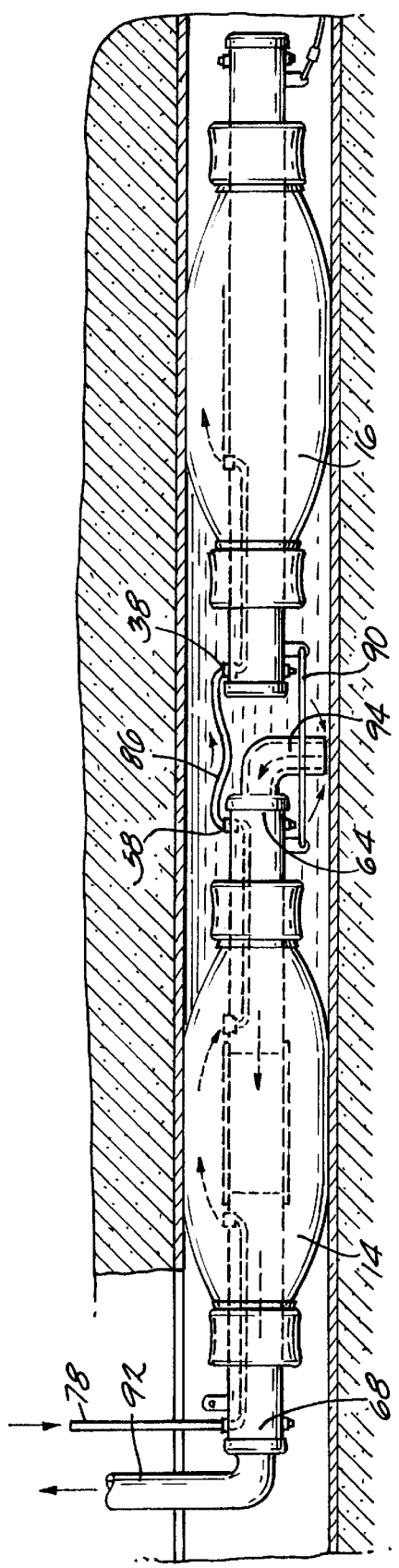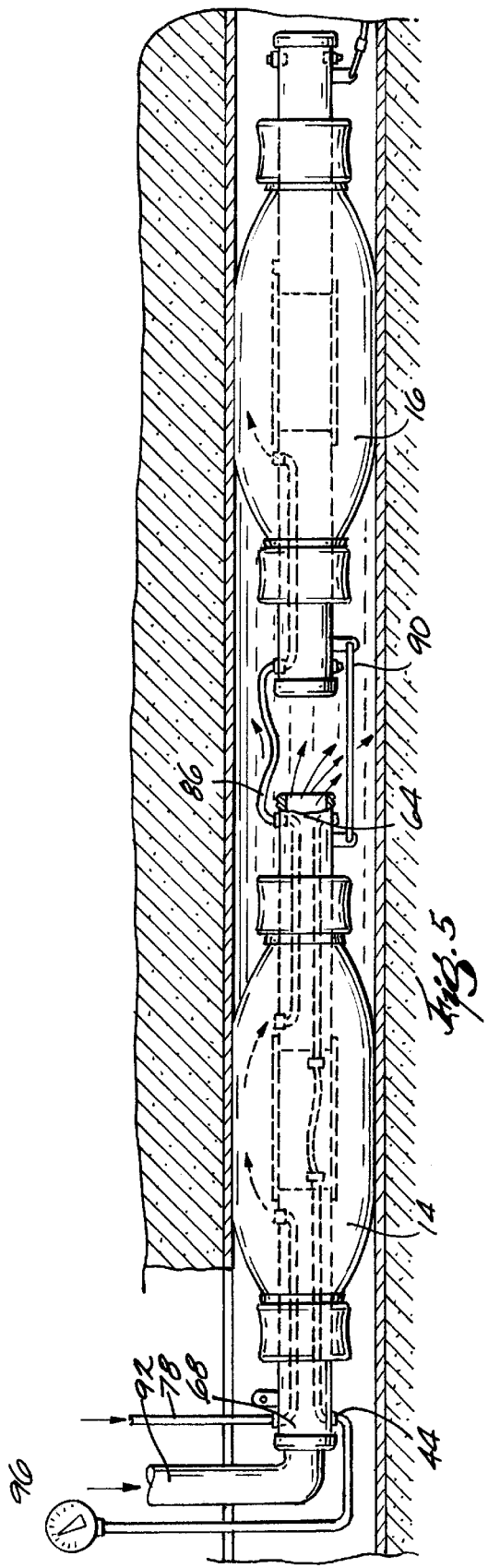

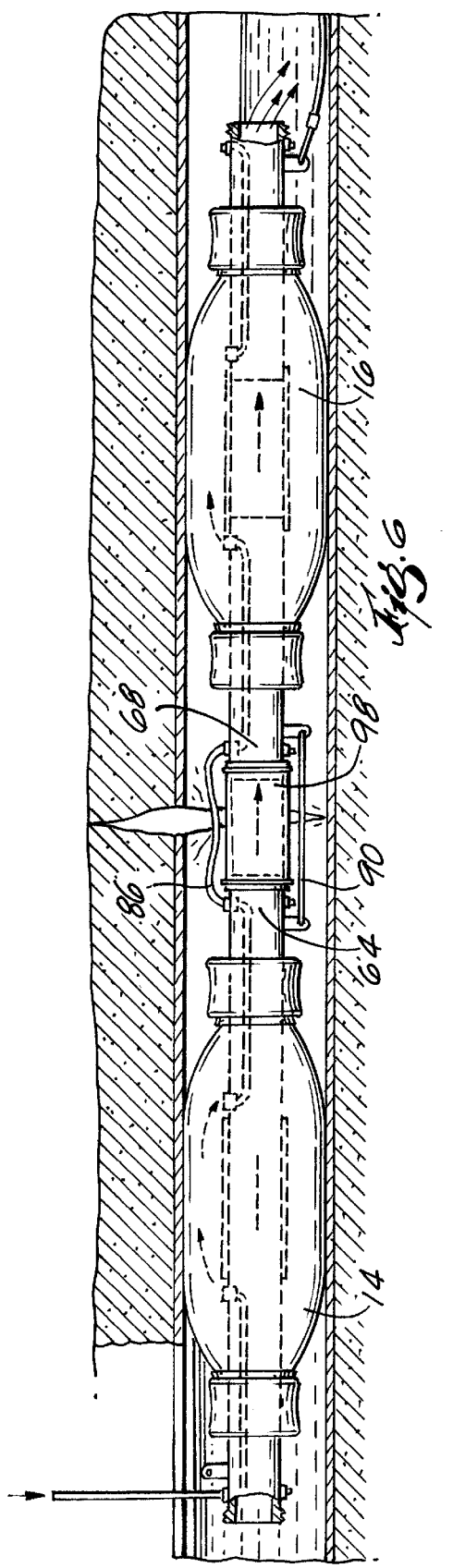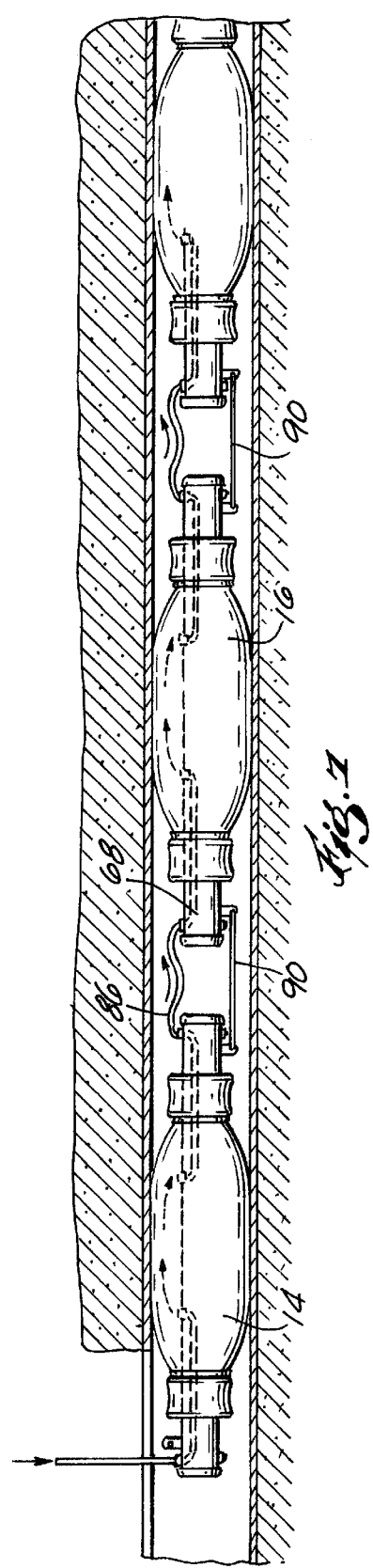

PIPE SEALING APPARATUS

FIELD OF THE INVENTION

The invention relates to a pipe sealing apparatus that is insertable in pipelines of varying diameters and inflatable therein to seal a section of pipeline. Such a pipe sealing apparatus is commonly referred to as an inflatable plug assembly.

BACKGROUND OF THE INVENTION

Inflatable plugs provide a useful means to mitigate the uncontrolled release of fluids from a pipeline when a break occurs in the pipeline and can also be used to isolate sections of pipeline when performing repair or maintenance on the pipeline.

One prior art inflatable plug is described in U.S. Pat. No. 5,901,752 which is assigned to the assignee of the present invention. The inflatable plug described there includes a first support member disposed at a first end and a second support member disposed at a second end. The inflatable plug includes an elongated inflatable sleeve of elastomeric material. The inflatable sleeve has a first sleeve end sealingly engaging the first support member to form a first ring of folds wrapped around the first support member when viewed in cross section generally perpendicular to a longitudinal axis of the first support member, and a second sleeve end sealingly engaging the second support member to form a second ring of folds wrapped around the second support member when viewed in cross section generally perpendicular to a longitudinal axis of the second support member. An inner surface of the inflatable sleeve extends between the first and second inflatable sleeve ends and substantially defines an expandable inflatable space therein. A fluid supply inlet is disposed at the first end of the apparatus. The inlet is positioned in fluid communication with the inflatable space and operable to deliver fluid into the inflatable space to inflate the inflatable space. The apparatus further includes an elongated outer sleeve that substantially surrounds the inflatable sleeve and has an inner surface. The outer surface of the inflatable space is shiftable with respect to the inner surface of the outer sleeve during inflation of the inflatable space. The outer sleeve has a first sleeve end sealingly engaged around the first ring of folds to form a third ring of folds and a second outer sleeve end sealingly engaged around the second ring of folds to form a fourth ring of folds. The third and fourth ring of folds are positioned radially outward from the first and second ring of folds respectively.

Another inflatable plug is described in U.S. Pat. No. 4,565,222, also assigned to the assignee of the present invention. The inflatable plug described there includes an inflatable plug of flexible sheet material that is constructed to form an elongated cylinder. The ends of the inflatable plug are wrapped around rigid end supports and then metal collars are placed over the ends of the inflatable plug. The metal collars are swaged or clamped down to form a fluid tight seal between the end supports and the collars. One of the rigid end supports includes an open pipe connectable to a pressurized air or water supply. The plug is inserted into the pipeline in the deflated state and maneuvered into the desired section of the pipeline. Pressurized air or water is then delivered through the open pipe to fill the inflatable plug. The inflatable plug expands to fill the pipeline section and frictionally engages the inside wall of the pipeline section, thereby sealing or plugging the pipeline.

Another prior art inflatable plug may be used to clear a blockage inside a pipeline as well as to seal the pipeline. Such an inflatable plug is commonly referred to as a flow-through type inflatable plug. An example of a flow-through inflatable plug is described in U.S. Pat. No. 5,353,842, which is also assigned to the assignee of the present invention. The inflatable plug shown there includes an elongated cylinder with a central, longitudinal bore and an expandable covering surrounding the central cylinder. The expandable covering is comprised of an elastomeric material which is wrapped around the cylinder. At one end of the inflatable plug, a first fluid inlet is provided for delivering pressurized air or water between the outer surface of the cylinder and the inner surface of the covering and a second fluid inlet is provided for delivering pressurized fluid to the cylinder bore. When the plug is inserted in a pipeline adjacent a pipe blockage, the first fluid inlet is used to inflate and expand the space between the covering and the cylinder, such that the outer surface of the plug sealingly engages the inside surface of the pipeline section. Then, pressurized fluid is delivered through the second fluid inlet and into the cylinder bore. This pressurized fluid is discharged at the opposite end of the cylinder bore in the direction of the pipe blockage, thereby clearing the blockage from the pipe.

SUMMARY OF THE INVENTION

The present invention provides an inflatable plug assembly that includes a first inflatable plug connected to a second inflatable plug by an elongated flexible tensile member and a fluid pressure hose. Each inflatable plug has a plurality of ports that may be connected to a fluid pressure source, plugged, or left unplugged depending upon the application. The second inflatable plug may be inflated either simultaneously with the first plug, or independently of the first plug. Each inflatable plug also has a fluid flow-through conduit.

The invention also provides a method for sealing a defined section of pipe. A first inflatable plug and a second inflatable plug are positioned in a spaced apart relation in a section of pipe, the first and second inflatable plugs being connected by an elongated flexible tensile member and by a fluid pressure hose. The fluid pressure hose may be connected for either common inflation or independent inflation. Once the inflatable plug assembly is positioned in the desired spaced apart relation in the pipe, the plugs are inflated by connecting the first inflatable plug to a fluid pressure source. When the inflatable plug assembly has sealed the defined section of pipeline, the operator may then proceed to perform the desired function.

The invention also provides a method for evacuating a defined section of pipe. After the section of pipeline has been sealed using a first and second inflatable plug connected for common inflation, the isolated area can be evacuated for repair or maintenance. In order to completely evacuate the isolated area, a hose can be attached to the fluid flow-through conduit of the first inflatable plug. The opposite end of the fluid flow-through conduit of the first plug is attached to a hose that is connected to a pump for removal of material located in the isolated area. The fluid flow-through conduit of the second plug is capped to seal the isolated area. The fluid is pumped from the isolated area until all material has been evacuated. The operator may then perform the desired repair or maintenance on the section of pipeline. When replacing a valve in the pipeline, for example, a plug assembly may be inserted into the pipeline such that it is positioned both upstream and downstream of the valve to thereby isolate the valve from the pipeline system and to allow for removal of the old valve. Inflatable plug assemblies may also be used with existing pipeline valves to safely isolate an area where hot work is to be performed.

The invention also provides a method for pressure testing a defined section of pipe. After a section of pipeline has been sealed using a first and second inflatable plug connected for common inflation, the isolated area can be pressure tested. The flow-through conduit of the first plug is set up similar to the evacuation process with the exception of the pump forcing fluid into the isolated area instead of removing it from the isolated area. A pressure testing device is connected to the independent inflation conduit which is in fluid communication with the isolated area. As the pump fills the isolated area with pressurized fluid, the pressure testing device produces an output indicating the pressure in the area. The operator can fill the isolated area to whatever pressure is needed to assure the segment of pipeline retains the ability to withstand predetermined pressure levels.

The invention also provides a method for fluid flow through a defined section of pipeline. After the section of pipeline has been sealed using a first and second inflatable plug connected for either common inflation or independent inflation, the fluid can flow through the inflatable plug assembly until the broken pipe segment is repaired or replaced. The flow-through conduit of the first plug is connected to the flow-through conduit of the second plug by connecting a flexible hose to the threaded interior ends of the first and second plugs. The threaded exterior ends are also left open to allow fluid to flow freely through the assembly. The fluid ports that are not used are plugged.

The invention also provides a method for plugging a pipeline wherein multiple plugs are used in series to present a greater friction force in opposition to the pressure in the pipeline. The inflatable plugs are used in series and the multiple plugs are set up for common inflation.

BRIEF DESCRIPTION OF THE DRAWINGS

FIG. 1 is a cross section elevation view of a pipe sealing apparatus embodying the invention, and shown inserted in a section of a pipeline and in the inflated state.

FIG. 2 is an enlarged view of the pipe sealing apparatus shown in FIG. 1.

FIG. 3 is a view similar to FIG. 1 and showing the pipe sealing plugs inflated by two different fluid pressure sources.

FIG. 4 is a view similar to FIG. 1 and showing the pipe sealing apparatus used to evacuate a section of pipeline.

FIG. 5 is a view similar to FIG. 1 and showing the pipe sealing apparatus used to pressure test a section of pipeline.

FIG. 6 is a view similar to FIG. 1 and showing the pipe sealing apparatus used to isolate a broken section of pipeline and provide a fluid conduit through the section of broken pipeline.

FIG. 7 is a view similar to FIG. 1 and showing the pipe sealing apparatus as including multiple plugs for sealing the pipeline.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates a pipe sealing apparatus embodying the present invention. More specifically, FIG. 1 depicts an inflatable plug assembly 10 housed in a section of pipeline 12 and in the inflated state. The inflatable plug assembly 10 includes two inflatable plugs 14 and 16 connected in series by a fluid pressure hose 18 and an elongated flexible tensile member 20. The elongated flexible tensile member 20 can be a chain, cable, rod, rope, wire or any other tensile force transmitting arrangement. The elongated flexible tensile member 20 is shorter than the fluid pressure hose 18 to assure the fluid pressure hose 18 is not stretched beyond its limits and broken. The elongated flexible tensile member 20 can be any length desired based upon the length of the section of pipeline being worked on.

As shown more clearly in FIG. 2, each inflatable plug is comprised of two spaced sections of pipe 22 and 24 or other rigid tubes joined together by an elongated fabric bag 26. The plug forms a generally elongated body having a rigid leading end 28, an expandable and flexible middle section 30, and a rigid trailing end 32. Each of the leading end 28, the trailing end 32, and the middle section 30 is positioned about a common longitudinal axis of the inflatable plug assembly. The middle section, or elongated fabric bag 30, has one end wrapped around a central part of the leading pipe section 24, and is secured thereto by a collar 34. The collar 34 is swaged so as to firmly compress the fabric of the middle section 30 to the pipe 24. The opposite end of the elongated bag 30 is wrapped around the central part of the other section 22 of pipe and is similarly clamped by a swaged collar 36. Specific construction of the middle section material and method of constructing such is shown and described in U.S. Pat. No. 5,901,752, which is incorporated herein by reference.

Each of the inflatable plugs 14 and 16 also includes a first port 38 that extends through the wall of the trailing pipe section 32, and connects to a conduit 40 housed in the pipe 22 and extending along the length of the pipe 22 to a second port 42 that communicates with the interior of the inflatable middle section 30. The inflatable plug also includes a third port 44 that extends through the wall of the trailing pipe section, and connects to a conduit 46 that is connected to a pressure hose fitting 48 at the interior end of the trailing pipe section 22. A fluid pressure hose 50 connects the pressure hose fitting 48 to a second pressure hose fitting 52 at the interior end of the leading pipe section. In the illustrated construction the fluid pressure hose 50 is formed from a flexible material to allow for insertion of the inflatable plug into the pipeline. In some applications, it may be necessary to insert the plug vertically downwardly through an opening in the pipe wall and then turn the plug 900 so that it can be inserted horizontally into the pipe. If the inflatable plug is relatively inflexible, such manipulation of the plug can be difficult. It is for the same reason that the deflated plug diameter is relatively small. The second pressure hose fitting 50 is connected to a complementary conduit section 54 that is in turn connected to a fourth port 56 that extends through the wall of the leading end 28 of the inflatable plug. The leading end 28 may also have a fifth port 58 that communicates with the interior of the middle section 30. The fifth port extends through the wall of the leading end 28 and is connected by a hose 60 to a sixth port 62 that extends through the wall of the inner end of the leading end 28. The second inflatable plug has a similar construction to the first inflatable plug, however, it may simply have a port that is in fluid communication with the middle section. Other ports may be provided and plugged when not in use.

The leading pipe section 24 includes a projecting end 64 that is threaded for selective attachment of a hose (not shown). In the illustrated arrangement the threaded projecting end is capped by a cap 66 threaded onto the end 64. The trailing end similarly includes a threaded end 68 capped by a cap 70. The interior ends of pipe sections 22 and 24 are joined by a flexible hose 72 having opposite ends secured to the respective pipes 22 and 24 by clamps or bands 74 and 76.

In one preferred embodiment of the invention, the port 38 is a threaded bore or inlet that is fitted with a compression fitting assembly onto which a high pressure flexible conduit 78 (i.e. rubber hose) is connected. The flexible conduit 78 is connectable to an external source of pressurized fluid (not shown), such as compressed air, which is used to deliver pressurized fluid to the inflation conduit 78 and into the inflatable middle section 30.

FIGS. 1 and 2 illustrate a method for use of an inflatable plug assembly 10 wherein a single fluid pressure source is used for inflation of both inflatable plugs 14 and 16. In order to inflate the second inflatable plug, port 38 of the first inflatable plug 14 is connected to a fluid pressure source through fluid line 78. The connection at port 38 will be utilized to fill the inflatable middle sections of the both the first inflatable plug 14 and second inflatable plug 16. Fluid pressure from port 38 is supplied through conduits 40, 60, 18 and 80 to inflate the second inflatable plug 16. Port 56 of the second inflatable plug 16 can be closed by a threaded plug 84.

FIG. 3 illustrates a method for use of the inflatable plug assembly embodying the invention wherein the two inflatable plugs 14 and 16 are inflated from separate or independent pressure sources. Independent inflation of the second plug may be useful in order to permit one of the two inflatable plugs to be inflated under greater pressure than the other of the inflatable plugs. In order to inflate the second inflatable plug independently of the first inflatable plug, port a first source of fluid pressure is connected through conduit 78 and port 38 to the first inflatable plug and a second source of fluid pressure is connected through conduit 84 to port 44 of the first inflatable plug. Fluid pressure is provided from conduit 84 through conduit 46, 50 and 54 to a tube 86 which connects to port 38 of the second inflatable plug 16 for inflation of the second inflatable plug 16. Port 58 of the second inflatable plug is plugged by a threaded plug 88. The connection at port 38 will be utilized to fill the inflatable middle section of the second inflatable plug 16.

FIG. 4 illustrates a method for evacuation of a segment of a pipeline using a pipe sealing assembly embodying the invention. The pipe sealing assembly for this application includes two inflatable plugs 14 and 16 in series that are connected by a tensile member 90 and a fluid pressure hose 86. The inflatable plugs are connected for common inflation with fluid pressure hose 86 joining port 58 of the first inflatable plug 14 to port 38 of the second inflatable plug 16. A hose 92 is connected from an external pump to the threaded end 68 of the first inflatable plug for removal of fluid and material from the isolated area of pipeline. A hose 94 is attached to the threaded end 64 of the first inflatable plug. The hose 94 needs to be long enough to travel from the threaded connection 64 to the lowest area in the isolated area of pipeline. The threaded ends 68 and 64 of the second plug 16 are capped with a threaded caps thereby blocking the flow-through capability of the second inflatable plug. The pipe sealing assembly is inserted into the section of pipeline through an opening in the pipeline, positioning the inflatable plugs in spaced apart relation in the pipe by pulling the assembly with a tensile force transmitting arrangement so as to define a length of pipe volume between the plugs. The spaced apart plugs are then commonly inflated. Once the pipe sealing assembly seals off the defined section of pipe, steps can be taken to evacuate the isolated area of pipeline for routine maintenance or repair. The fluid is pumped by an externally located pump from the isolated area until all material has been evacuated. The operator may then perform the desired repair or maintenance on the section of pipeline.

FIG. 5 illustrates a method for pressure testing a segment of pipe using a pipe sealing assembly embodying the invention. The illustrated pipe sealing assembly for this application includes two inflatable plugs 14 and 16 in series that are connected by an elongated tensile member 90 and a fluid pressure hose 86. The inflatable plugs 14 and 16 are connected for common inflation, and a pressure sensing device is connected to port 44 of the first inflatable plug. Port 56 of the first inflatable plug 14 is left open to the isolated area of pipeline. The pipe sealing assembly is inserted into the section of pipe through an opening in the pipe, with the inflatable plugs positioned in spaced apart relation in the pipeline so as to define a volume between the plugs 14 and 16. The spaced apart plugs 14 and 16 are then commonly inflated steps sealing off a section of pipeline. Steps can then be taken to test the pressure of the isolated area of pipeline. The isolated area may first be evacuated of any material to allow for pressure testing using uniform fluid. Fluid is then forced into the space between the inflated spaced apart plugs. This may be done by forcing fluid through a hose 92 connected to the threaded end 68 of the first inflatable plug. The threaded end 64 of the first inflatable plug is left open thereby allowing fluid pumped into the flow-through conduit to flow into the isolated area. A pressure reading can be obtained from the pressure sensing device 96 that is monitoring the pressure within the isolated area of pipeline. Once pressure testing is completed, the area can be depressurized by removing fluid and then the section of pipeline can return to normal operation.

FIG. 6 illustrates a method for using the pipe sealing assembly embodying the invention to provide for fluid flow through a broken or damaged section of pipe or pipeline 12. The pipe sealing assembly used in this method includes two inflatable plugs 14 and 16 in series that are connected by an tensile member 90 and a fluid pressure hose 86. The inflatable plugs 14 and 16 may be connected for either independent or common inflation, and a flexible hose 98 is connected between the threaded end 64 of the first inflatable plug 14 and the threaded end 68 of the second inflatable plug 16. This hose thereby makes a continuous fluid conduit from the threaded end of the first inflatable plug to the threaded end of the second inflatable plug. All ports that are not being used are plugged to seal the inflation conduits off from material in the pipeline. The pipe sealing assembly is inserted into the section of pipe through an opening in the pipe, positioning the inflatable plugs in spaced apart relation in the pipe so as to define a length of pipe volume between the plugs. The first inflatable plug will commonly be upstream of a break in the pipe and the second inflatable plug will commonly be downstream of a break in the pipe. The spaced apart plugs are then inflated. Once the pipe sealing assembly is sealing off the defined section of pipe, the fluid in the pipeline can flow freely through the flow-through type inflatable plug assembly until the broken pipe segment is repaired or replaced.

FIG.7 illustrates a method for sealing a pipe using a pipe sealing assembly having multiple inflatable plugs. The pipe sealing assembly for this application includes at least two inflatable plugs in series that are connected by elongated flexible tensile members and fluid pressure hoses. The inflatable plugs are preferably connected for common inflation. The threaded ends of the leading and trailing ends of the inflatable plugs are capped using a threaded nipple. The ports that are not used are also plugged with a threaded plug. The pipe sealing assembly is inserted into the section of pipe through an opening in the pipe, positioning the inflatable plugs in spaced apart relation in the pipe so as to define pipe volumes between the plugs. The spaced apart plugs are then commonly inflated. Once the pipe sealing assembly is sealing off the defined section of pipe, a seal resisting the fluid pressure of the fluid in the pipeline should be established. If the fluid pressure in the pipeline is applying a force that is still greater than the friction force of the inflatable plug assembly, the assembly may be deflated and additional inflatable plugs added to provide greater resistance to the fluid pressure force of the fluid in the pipeline.

Various features of the invention are set forth in the following claims.

What is claimed is:

1. An inflatable plug assembly for plugging a pipe to restrict a flow of fluid through the pipe, the inflatable plug assembly comprising:
    a first inflatable plug including
        an inflatable middle section with a first end and a second end,
        a leading pipe section supporting said first end of said inflatable middle section,
        a trailing pipe section supporting said second end of said inflatable middle section,
        a first fluid port that extends through the wall of said leading pipe and is in fluid communication with said inflatable middle section,
        a second fluid port that extends through the wall of said leading pipe,
        a third fluid port that extends through the wall of said trailing pipe,
        a first fluid conduit housed at least partially within said leading pipe section and said trailing pipe section and extending between said second fluid port and said third fluid port, the first fluid conduit having
            a first pressure hose fitting at the interior end of said leading pipe section,
            a first tensile conduit continuous from said second fluid port to said first pressure hose fitting,
            a second pressure hose fitting at the interior end of said trailing pipe section,
            a flexible conduit that connects said first pressure hose fitting to said second pressure hose fitting,
            a second tensile conduit that is continuous from said second pressure hose fitting to said third fluid port; and
    a second inflatable plug connected to the first inflatable plug in spaced apart relation by an elongated flexible tensile member and by a fluid pressure hose.

2. An apparatus as claimed in claim 1, wherein the first inflatable plug further includes:
    a fourth fluid port that extends through the wall of said leading pipe section and is in fluid communication with said first inflatable plug;
    a second fluid conduit that connects to said first fluid port and is continuous to said fourth fluid port;
    a fifth fluid port that extends through the wall of saw trailing pipe section and is in fluid communication with the first inflatable plug;
    a sixth fluid port that extends through the wall of said trailing pipe section; and
    a third fluid conduit that connects to said fifth fluid port and is continuous to said sixth fluid port.

3. An apparatus as claimed in claim 2, wherein the second inflatable plug includes:
    a second inflatable middle section with a first end and a second end;
    a second leading pipe section supporting said first end of said second inflatable middle section;
    a second trailing pipe section supporting said second end of said second inflatable middle section;
    a seventh fluid port that extends through the wall of said second leading pipe and is in fluid communication with said second inflatable middle section.

4. An apparatuses claimed in claim 3, wherein the fluid pressure hose is continuous from said sixth fluid port to said seventh fluid port for common inflation of said first inflatable plug and said second inflatable plug.

5. An apparatus as claimed in claim 3, wherein the fluid pressure hose is continuous from said third fluid port to said seventh fluid port for independent inflation of said second inflatable plug.

6. An apparatus as claimed in claim 1, wherein the first inflatable plug further includes:
    a flexible conduit that runs through said first inflatable plug and connects said leading pipe section to said trailing pipe section to allow for flow-through capabilities.

7. An apparatus as claimed in claim 1, wherein the fluid ports are threaded bore or inlet fitted with a compression fitting assembly onto which a high pressure flexible conduit may be connected.

8. An apparatus as claimed in claim 1, wherein the distal end of said leading pipe section is threaded for selective attachment of a hose or a threaded nipple.

9. An apparatus as claimed in claim 1, wherein the distal end of said trailing pipe section is threaded for selective attachment of a hose or a threaded nipple.

10. An apparatus as claimed in claim 1, wherein the elongated flexible tensile member is formed by a chain.

11. A method for sealing a section of pipe, the method comprising the acts of:
    providing a first inflatable plug;
    providing a second inflatable plug connected to the first plug in spaced apart relation by an elongated flexible tensile member and by a fluid pressure hose;
    inserting the plugs into the section of pipe through an opening in the pipe;
    positioning the plugs in spaced apart relation in the pipe so as to define a length of pipe volume between the plugs;
    inflating the spaced apart plugs; and
    positioning a hose in the defined section of pipe and connecting the hose to a pump to remove fluid from the space between the spaced apart plugs.

12. A method as set forth in claim 11, and further including the step of forcing fluid into the space between the inflated spaced apart plugs.

13. A method as set forth in claim 12, wherein the step of forcing fluid into the space between the inflated spaced apart plugs includes:
    measuring the pressure of the isolated area.

14. A method as set forth in claim 12, wherein the step of forcing fluid into the space between the inflated spaced apart plugs includes:
    forcing fluid through a pipe extending through one of the plugs.

15. A method as set forth in claim 11, wherein the step of positioning a hose in the defined section of pipe and connecting the hose to a pump to remove fluid from the space between the spaced apart plugs includes:

running the hose through a pipe extending through one of the plugs.

16. A method as set forth in claim 11, wherein the step of inflating the plugs includes:

forcing fluid through a first fluid port into one of the plugs to inflate said one of said plugs; and forcing fluid through a conduit extending through said first one of said plugs and connected to the other of said plugs to inflate said other of said plugs.

17. A method as set forth in claim 11, wherein the step of inflating the plugs includes:

forcing fluid through a fluid conduit that connects a first fluid port in said one of the plugs to a second fluid port in said second of said plugs to inflate said plugs.

* * * * *